United States Patent [19]

Matsuda et al.

[11] Patent Number: 5,218,268
[45] Date of Patent: Jun. 8, 1993

[54] OPTICAL FILTER FOR CATHODE RAY TUBE

[75] Inventors: Hidemi Matsuda, Oomiya; Takeo Itou, Kumagaya; Kazuhiko Shimizu, Fukaya, all of Japan

[73] Assignee: Kabushiki Kaisha Toshiba, Kawasaki, Japan

[21] Appl. No.: 869,114

[22] Filed: Apr. 15, 1992

Related U.S. Application Data

[63] Continuation of Ser. No. 606,200, Oct. 31, 1990, abandoned.

[30] Foreign Application Priority Data

Oct. 31, 1989 [JP] Japan .................. 1-281692

[51] Int. Cl.⁵ .................................... H01J 29/88
[52] U.S. Cl. ...................... 313/478; 313/479; 313/112; 313/313; 358/253
[58] Field of Search ........... 313/112, 478, 479, 466, 313/474, 313; 350/166, 1.7, 311; 252/584, 586, 589; 359/360, 885, 589; 358/253

[56] References Cited

U.S. PATENT DOCUMENTS

| 4,398,119 | 8/1983 | Dodds et al. | 313/466 |
| 4,755,716 | 6/1988 | Hayafune et al. | 313/479 X |
| 4,937,493 | 6/1990 | Koike et al. | 313/479 |
| 4,977,347 | 12/1990 | Iou et al. | 313/478 |
| 4,987,338 | 1/1991 | Iou et al. | 313/478 |

FOREIGN PATENT DOCUMENTS

| 0335680 | 4/1989 | European Pat. Off. . |
| 3701654 | 7/1987 | Fed. Rep. of Germany . |
| 57-134848 | 8/1982 | Japan . |
| 0018901 | 1/1986 | Japan . |
| 64-27146 | 1/1989 | Japan . |

Primary Examiner—Donald J. Yusko
Assistant Examiner—Ashok Patel
Attorney, Agent, or Firm—Cushman, Darby & Cushman

[57] ABSTRACT

A cathode ray tube has a vacuum envelope which includes a faceplate, an optical filter formed on the faceplate, the optical filter including mainly of $SiO_2$ and containing a coloring material, and a phosphor layer formed on the inner surface of the faceplate. The optical filter includes silicon having a fluorine-containing group and a siloxane bond at least on the surface thereof, and a maximum light absorption wavelength in a range of 400 to 650 nm is in a region of $575 \pm 20$ nm, and where the transmissivity for the wavelength of 450 nm is $T_{450}$, that for 530 nm is $T_{530}$, that for 550 nm is $T_{550}$, that for 630 nm is $T_{630}$, and that for the maximum absorption wavelength is $T_{min}$, the following relationship is established:

$T_{min} \leq T_{550} \leq T_{530}$, $1 \leq T_{450}/T_{539} \leq 2$, $1 \leq T_{630}/T_{530} \leq 2$, $0.7 \leq T_{450}/T_{630} \leq 1.43$.

12 Claims, 7 Drawing Sheets

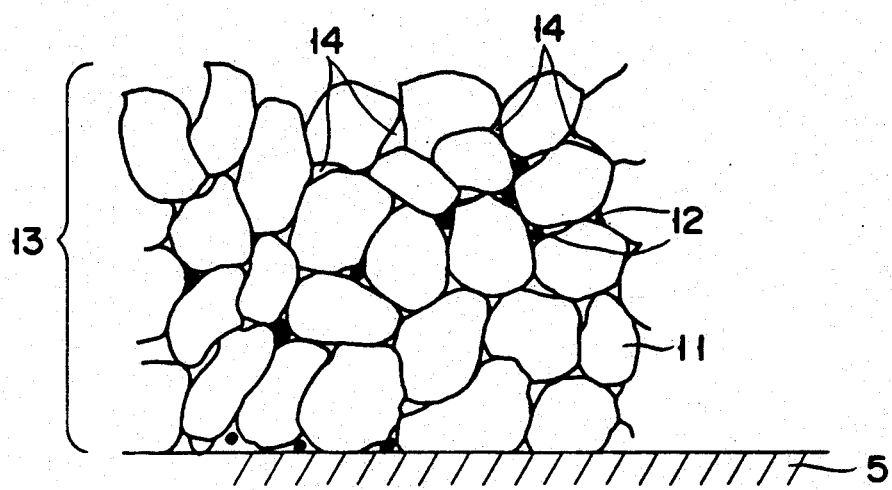
F I G. 5
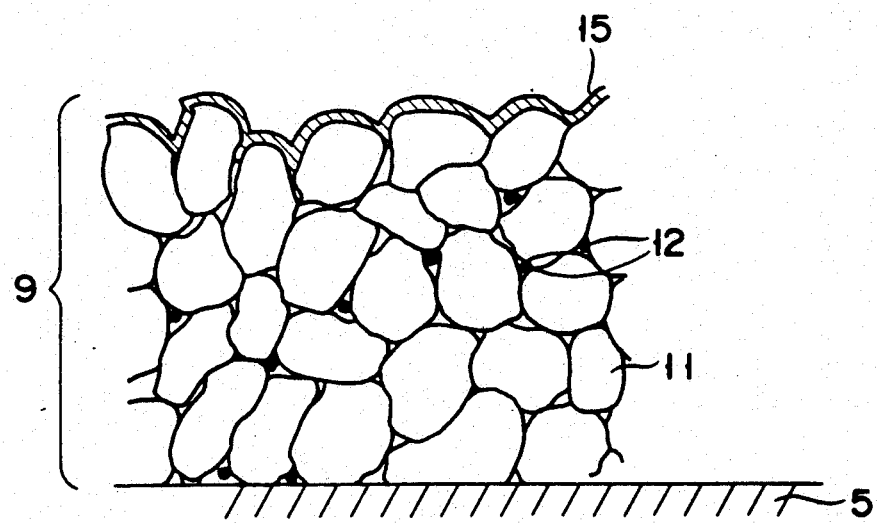
F I G. 6

OPTICAL FILTER FOR CATHODE RAY TUBE

This is a continuation of application No. 07/606,200 filed on Oct. 31, 1990, which was abandoned the filing hereof.

BACKGROUND OF THE INVENTION

1. Field of the Invention

The present invention relates generally to a cathode ray tube and more particularly to a cathode ray tube having a thin film with light selective absorptivity on the front surface of its faceplate.

2. Description of the Related Art

A cathode ray tube functions to display characters, images, etc. In this case, an electron beam emitted from an electron gun provided in a neck portion of an envelope impinges upon a phosphor screen in which dot-shaped or stripe-shaped red-, green- and blue-emitting phosphors are provided regularly on the inner surface of a glass faceplate. In general, a glass plate (neutral filter) having a substantially constant transmissivity with respect to visible radiation is attached to the front surface of the faceplate, thereby to suppress reflection of external light on the phosphor screen formed on the inner surface of the faceplate and to improve the contrast of displayed images.

The external light reflected by the phosphor screen formed on the inner surface of the faceplate is attenuated in proportion to $T^2$ by virtue of the neutral filter (glass plate), and thereby the contrast of displayed images is improved. However, supposing that the transmissivity of the glass plate is T, the brightness of images decreases in proportion to the transmissivity T of the glass plate. This technique, therefore, is not desirable.

To address this problem, there has been proposed a cathode ray tube having on the front surface of its faceplate a glass plate containing neodymium oxide ($Nd_2O_3$) and having light selective absorptivity, thereby suppressing a decrease in brightness of images and improving the contrast of images (Published Unexamined Japanese Patent Application (PUJPA) No. 57-134848, PUJPA No. 57-134849, and PUJPA No. 57-134850). By virtue of the inherent absorption properties of neodymium oxide, the glass plate has a main absorption band in a range of 560 nm to 615 nm and a sub absorption band in a range of 490 nm to 545 nm. Thus, the color purity of red and blue images can be increased.

This type of glass plate, however, fails to improve the contrast of images remarkably, even though it has the above-mentioned light selective absorptivity. There is known a method of evaluating the improvement of the contrast, on the basis of BCP (Brightness Contrast Performance). The BCP is given by $BCP = \Delta B / \sqrt{\Delta Rf}$, where $\Delta B$ is the decrease in brightness, $\Delta Rf$ is the decrease in external light reflectance. The BCP represents a contrast improvement ratio evaluated on the basis of a system using a neutral filter. When the characteristic of a filter having the selective absorptivity of neodymium oxide is evaluated on the basis of the BCP, it is found that the BCP is $1 \leq BCP \leq 1.05$ and the contrast is not improved sufficiently.

The glass plate containing neodymium oxide has the main absorption band in a wavelength range of 560 nm to 615 nm. In addition, a steep portion of a peak width of 5 nm to 10 nm is included within the region of 560 to 570 nm of the main absorption band. Thus, the color (body color) of the glass plate itself is changed by external light. In particular, the body color of the glass plate becomes reddish under the light of an incandescent lamp. As a result, low-luminance parts of an image, such as a black part and a shadow part, become reddish, and it becomes difficult to see the image. In addition, the quality of image is degraded. Furthermore, since neodymium is an expensive material, the manufacturing cost of the glass plate increases.

SUMMARY OF THE INVENTION

An object of the present invention is to improve an optical filter layer having light selective transmissivity, which is formed on a faceplate of a cathode ray tube. In particular, this invention aims at providing a cathode ray tube including an optical filter layer having an excellent light selective transmissivity and an excellent moisture-proof property, whereby the decrease in brightness of images can be prevented.

Another object of the invention is to provide a cathode ray tube having an excellent light selective transmissivity and an excellent anti-static property, whereby the decrease in brightness of images can be prevented.

According to the present invention, there is provided a cathode ray tube comprising a vacuum envelope, said envelope including:

a faceplate;

an optical filter formed on the outer surface of said faceplate, said optical filter including mainly $SiO_2$ and containing a coloring material; and a phosphor layer formed on the inner surface of the faceplate, wherein the optical filter includes silicon compound having a fluorine-containing group and a siloxane bond at least on the surface thereof and a maximum light absorption wavelength in a range of 400 to 650 nm is in a region of $575 \pm 20$ nm, and where the transmissivity for the wavelength of 450 nm is $T_{450}$, that for 530 nm is $T_{530}$, that for 550 nm is $T_{550}$, that for 630 nm is $T_{630}$, and that for the maximum absorption wavelength is $T_{min}$, the following relationship is established:

$$T_{min} \leq T_{550} \leq T_{530},$$

$$1 \leq T_{450}/T_{530} \leq 2,$$

$$1 \leq T_{630}/T_{530} \leq 2,$$

$$0.7 \leq T_{450}/T_{630} \leq 1.43.$$

The cathode ray tube of this invention includes an optical filter which has an excellent light selective transmissivity since the light absorption characteristic is effectively restricted, whereby the decrease in brightness can be prevented. In addition, since the optical filter has an excellent moisture-proof property, the elusion and degradation of the coloring material due to moisture infiltration can be prevented.

Furthermore, according to this invention, a moisture-absorbent metallic salt may be contained in the optical filter layer, so that the optical filter layer can be provided with an excellent anti-static function.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 shows a model of an optical filter layer formed by a sol-gel method;

FIG. 6 shows a model of an optical filter layer used in the cathode ray tube of the present invention;

DETAILED DESCRIPTION OF THE PREFERRED EMBODIMENT

An embodiment of the present invention will now be described with reference to the accompanying drawings.

Figure 1:
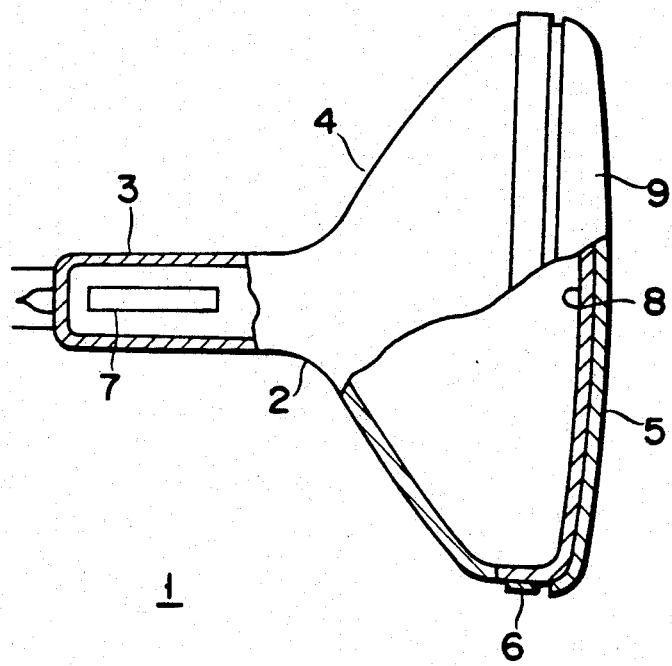
FIG. 1 is a partially cutaway view showing an embodiment of a cathode ray tube of the present invention.

FIG. 1 is a partially cutway view showing an embodiment of a cathode ray tube of this invention. A cathode ray tube 1 has an air-tight vacuum envelope 2 made of glass from which air is vacuumed. The vacuum envelope 2 has a neck 3 and a cone 4 continuous with the neck 3. The envelope 2 also has a faceplate 5 hermetically attached to the cone 4 by means of frit glass. An explosion-proof metallic tension band 6 is wound around the side wall of the faceplate 5. An electron gun 7 for emitting an electron beam is disposed in the neck 3. A phosphor screen 8 is formed on the inner surface of the faceplate 5. The phosphor screen 8 comprises stripe-shaped red-emitting, green-emitting and blue-emitting phosphor layers and a stripe-shaped black light absorbing layer interposed between each pair of adjacent phosphor layers. A shadow mask (not shown) with apertures in its entire area is disposed in the vicinity of the phosphor screen 8, such that the shadow mask faces the screen 8. A deflecting device (not shown) is mounted on the outside of the cone 4. The deflecting device deflects the electron beam so as to scan the phosphor screen 8.

The outer surface of the faceplate 5 of the cathode ray tube 1 is coated with an optical filter layer 9 having electrical conductivity and selective absorptivity. The filter layer 9 remarkably improves the anti-static characteristic and contrast of images to be displayed on the cathode ray tube 1.

The optical filter layer 9 includes silicon having a fluorine-containing group and a siloxane bond at least on the surface thereof. The optical filter layer 9 comprises a glass layer which consists mainly of $SiO_2$ and includes a coloring material. Regarding light absorption characteristics, the optical filter layer 9 has a maximum absorption wavelength in a range of 400 to 650 nm is in a region of $575 \pm 20$ nm. Where the transmissivity for the wavelength of 450 nm is $T_{450}$, that for 530 nm is $T_{530}$, that for 550 nm is $T_{550}$, that for 630 nm is $T_{630}$, and that for the maximum absorption wavelength is Tmin, the following relationship is established:

$Tmin \leq T_{550} \leq T_{530}$, $1 \leq T_{450}/T_{530} \leq 2$, $1 \leq T_{630}/T_{530} \leq 2$, $0.7 \leq T_{450}/T_{630} \leq 1.43$.

A description will now be given of the function of the light absorption characteristic of the optical filter used in the cathode ray tube of this invention.

Figure 2:
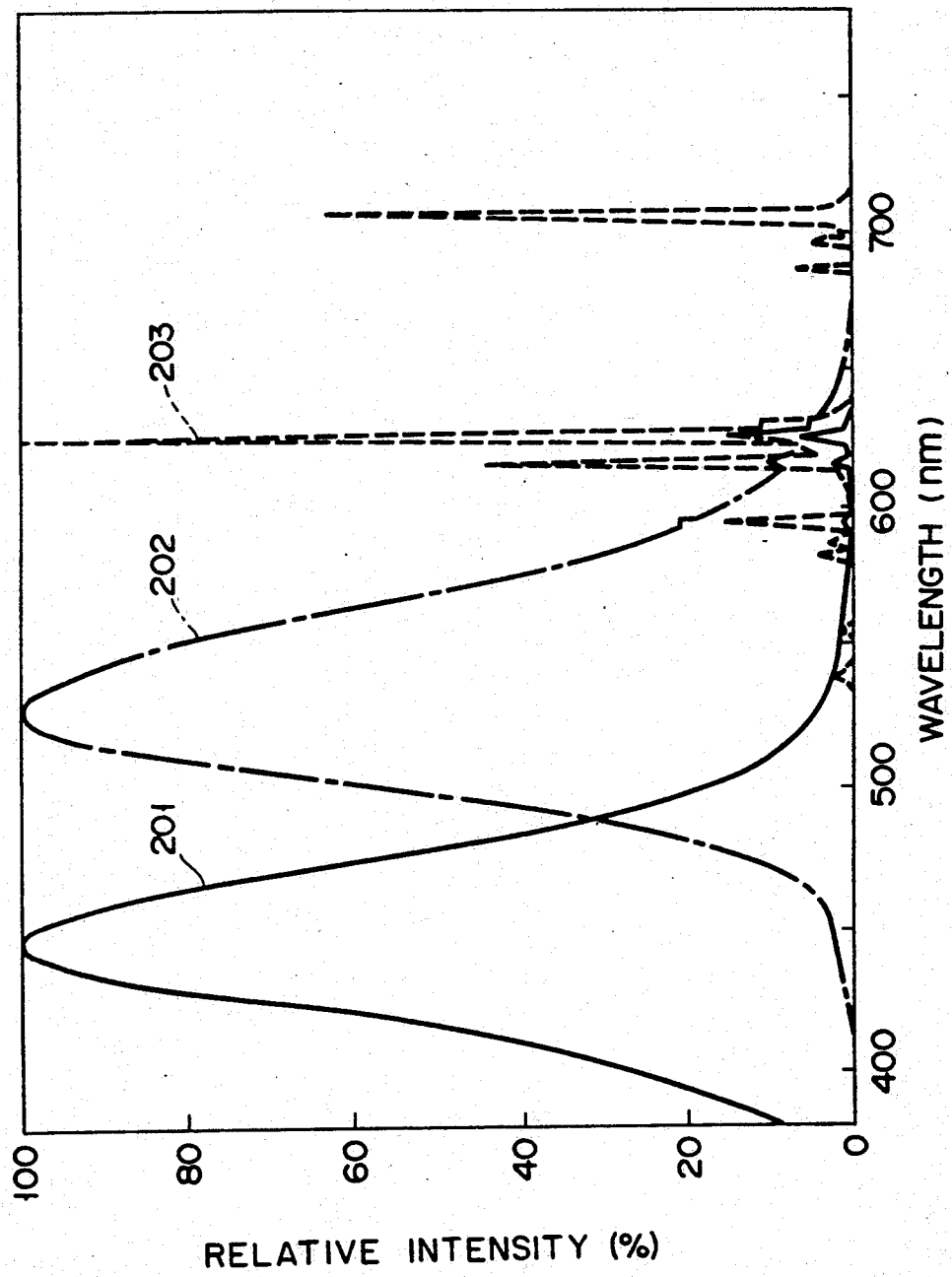
FIG. 2 is a graph showing emission light spectra of general red-, blue- and green-emitting phosphors.
Figure 3:
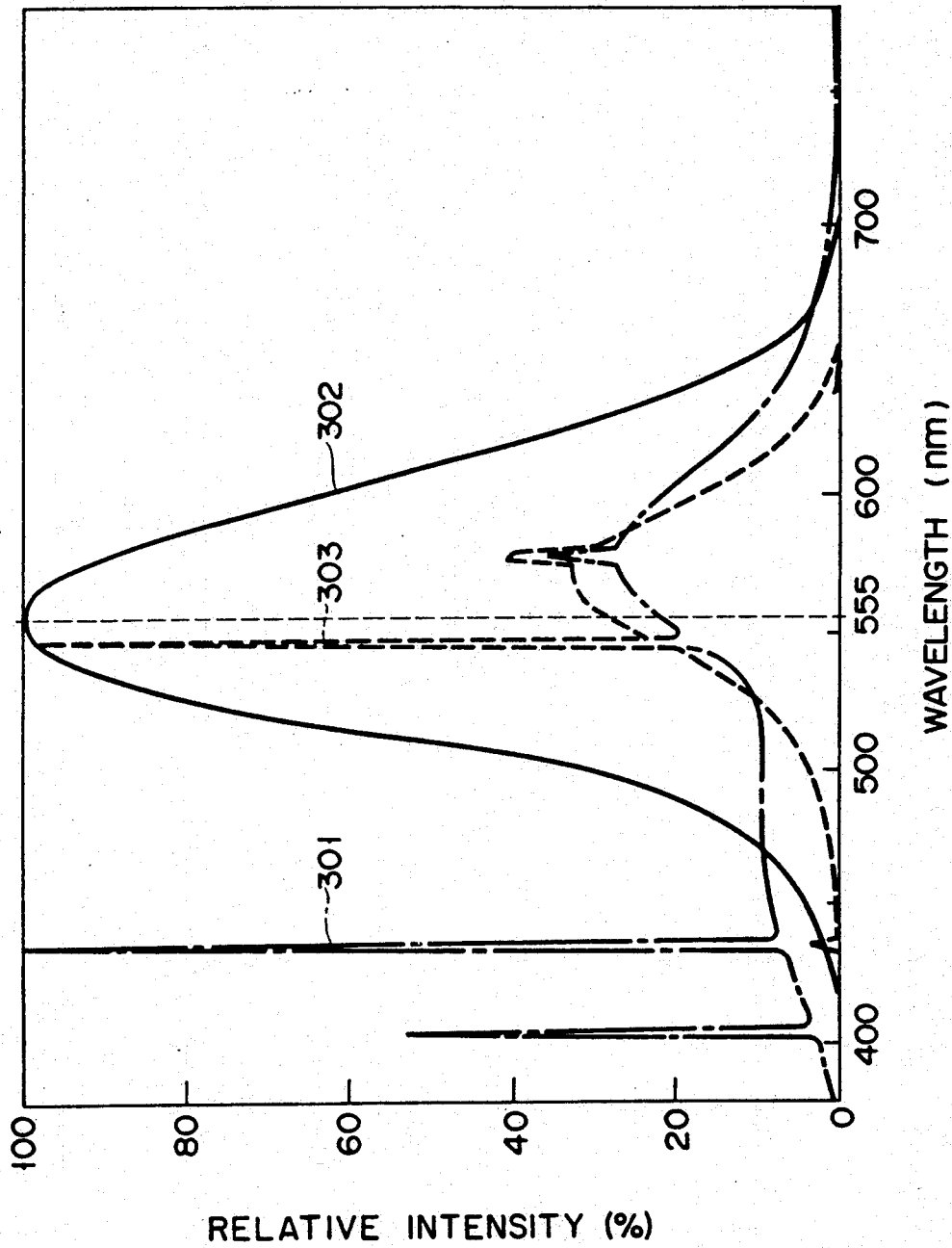
FIG. 3 is a graph showing a relative spectral distribution, a spectral luminous efficiency, and a product of the relative spectral distribution and the spectral luminous efficiency, when a general fluorescent lamp was employed.

FIG. 2 shows emission spectra of typical emission phosphors of blue (ZnS: Ag, Cl phosphor), green (ZnS: Cu, Al phosphor) and red ($Y_2O_2S$: $Eu^{3+}$ phosphor) used in the phosphor screen of the cathode ray tube. In FIG. 2, curve 201 denotes a spectrum of a blue-emitting phosphor, curve 202 a spectrum of a green-emitting phosphor, and curve 203 a spectrum of a red-emitting phosphor. FIG. 3 shows a curve 301 denoting a relative spectral distribution, a spectral luminous efficiency 302, and a curve 303 denoting a product of the relative spectral distribution and the spectral luminous efficiency, which are all obtained when a fluorescent lamp is employed as an external light source. As can be seen from FIGS. 2 and 3, it is thought that external light can be absorbed most effectively by cutting off the light with the wavelength of $575 \pm 20$ nm, which is in the vicinity of the maximum point of the curve 303. On the other hand, however, the lowering of brightness must be prevented as much as possible. Regarding the characteristics of the optical filter, the following is important. A maximum transmissivity and a maximum external light absorption appear at the wavelength of about 450 nm to 630 nm, at which the luminance is lowest and the emission energy of phosphors is high. A minimum transmissivity is attained at the wavelength of about 575 nm at which the emission energy of phosphors is low, and an intermediate transmissivity is attained at the wavelength of 530 nm at which the emission energy of green-emitting phosphor is highest. In addition, regarding the characteristic of the optical filter, in the range of wavelength of 575 nm to 530 nm, the external light energy is higher and the emission energy of the green-emitting phosphor is lower at about 550 nm than at about 530 nm. Thus, in the range of 575 nm to 530 nm, the light transmissivity is lower than that obtainable at 530 nm. Specifically, where the transmissivity for the wavelength of 450 nm is $T_{450}$, that for 530 nm is $T_{530}$, that for 550 nm is $T_{550}$, that for 630 nm is $T_{630}$, and that for the maximum absorption wavelength is Tmin, the following relationship should be met in the characteristics of the filter in order to improve the contrast most efficiently:

$Tmin \leq T_{550} \leq T_{530}$, $T_{530} \leq T_{630}$, $T_{530} \leq T_{450}$.

It was confirmed that the control of the body color of the optical filter was improved to a practical level by specifying the ratio of the transmissivity at each point so as to meet the following equations:

$$T_{450}/T_{530} = 1 \text{ to } 2 \tag{1}$$

$$T_{630}/T_{530} = 1 \text{ to } 2 \tag{2}$$

$$T_{450}/T_{630} = 0.7 \text{ to } 1.43 \tag{3}$$

When the value of equation (1) exceeds 2 or when the value of equation (3) exceeds 1.43, the body color becomes bluish. When the value of equation (2) exceeds 2 or the value of equation (3) is lower than 0.7, the body color becomes reddish, and the optical filter is impracticable. In addition, when the value of equation (1) or (2) is lower than 1, the contrast is not enhanced sufficiently and the value of the BCP lowers. In this case, too, the optical filter is impracticable.

By using this optical filter, the excellent contrast with the BCP of 1.05 to 1.50 can be obtained, though the contrast slightly varies depending on the emission spectra of the employed phosphors and the concentration of the filter material of the optical filter.

Figure 4:
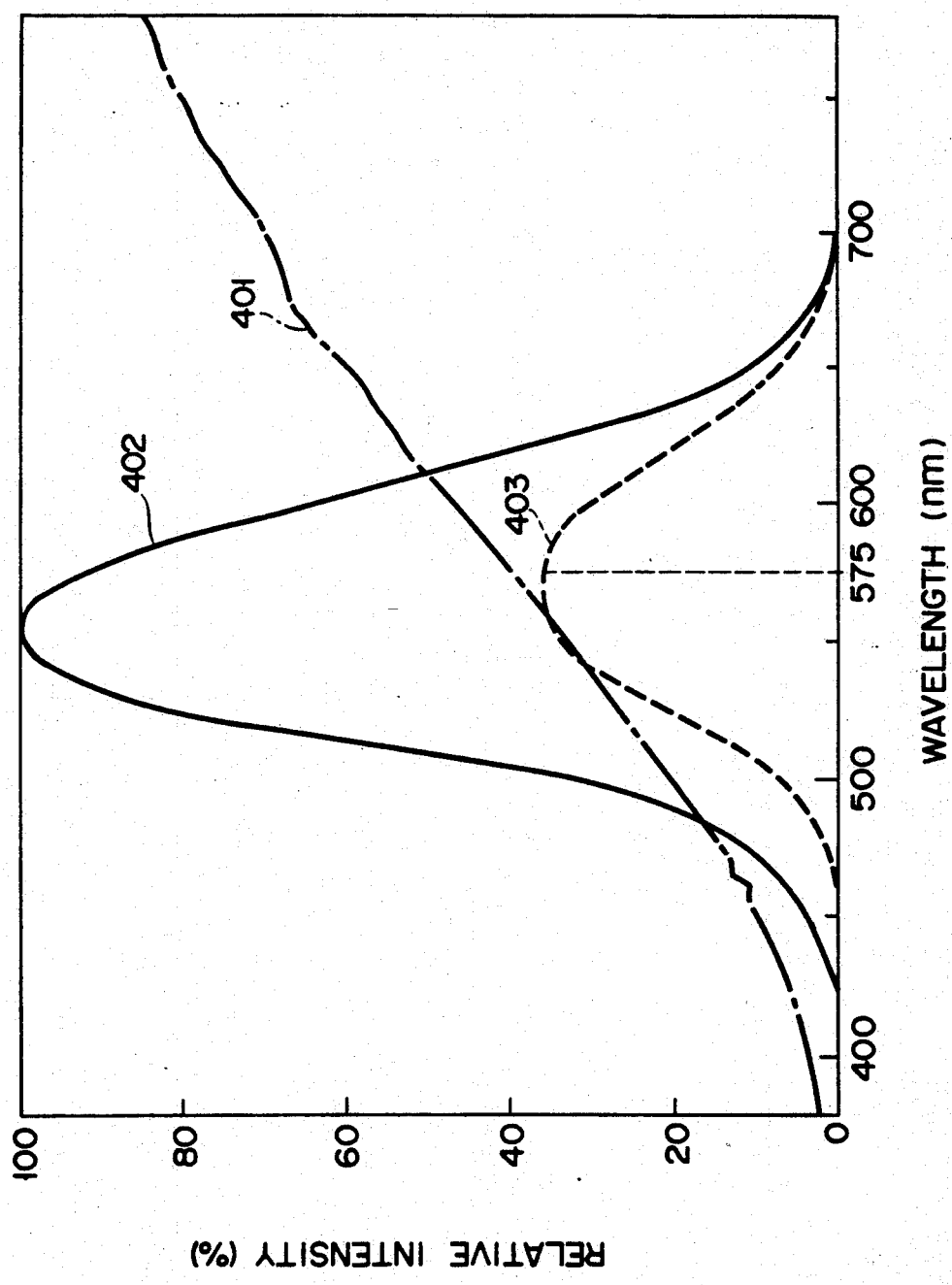
FIG. 4 is a graph showing a relative spectral distribution, a spectral luminous efficiency, and a product of the relative spectral distribution and the spectral luminous efficiency, when a general incandescent lamp was employed.

When an incandescent lamp is used as an external light source, the body color of the optical filter becomes reddish in some cases; however, the body color can be corrected with no practical problem, as will be explained hereinafter. FIG. 4 shows a curve 401 denoting a relative spectral distribution, a spectral luminous efficiency 402, and a curve 403 denoting a product of the relative spectral distribution and the spectral luminous efficiency, which are all obtained when a fluorescent lamp is employed as an external light source. As can be seen from FIG. 4, the greater the wavelength of the light from the incandescent lamp, the greater the emission light energy. Thus, even in the case of the cathode ray tube of the present invention, the body color of the tube with the color filter having selective absorption property may become reddish. In this case, the body color can be corrected without losing BCP improvement effect and the cathode ray tube with the body color less variable owing to external light can be obtained, in the following manner. The transmissivity of the optical filter in the range of 650 nm to 700 nm is made lower than that of the filter at 630 nm. Light having a wavelength in the range of 650 nm to 700 nm is more reddish, than that in the vicinity of 630 nm at which the emission energy of the red-emitting phosphor is high.

In general, a dye or the like used in the optical filter is vulnerable to heat, and it is decomposed and loses light absorption property at a high temperature of 200° C. or more. It is therefore impossible to seal the dye in glass material by using a method such as a melting method, which requires a high temperature of 1500° C. Under the situation, a so-called "sol-gel" method is used to obtain the optical filter of the present invention. A glass thin film used for the optical filter is produced by the sol-gel method in the following manner. First, in order to prepare a starting material, tetraethyl silicate (Si(OC$_3$H$_5$)$_4$), which is an alcoholate of, e.g. Si, water, an acid, and alcohol are mixed. The resultant liquid is left for a predetermined time period for maturing. Then, the following reactions will occur:

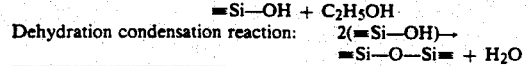

as these reactions occur repeatedly, siloxane bonds are formed, and the liquid becomes a solution of SiO$_2$ in which very fine SiO$_2$ primary particles are dispersed. The solution is further matured so that the SiO$_2$ primary particles gather to form secondary particles. The liquid with this phase is coated, dried and calcined, thus obtaining a glass thin film. In this case, if the calcination temperature is low, boundaries of SiO$_2$ fine particles produced in the maturing step are not completely bonded, with the result that a porous glass thin film with fine pores is formed. In order to sinter the fine particles completely, it is said that a high temperature of about 800° C. is necessary.

Since a thin film containing a dye cannot be calcined at a temperature of 200° C. or above, the resultant glass film is porous.

A model of an optical filter using the glass thin film will now be described. FIG. 5 shows a cross-sectional view of a model of an optical filter containing a dye, which is formed by the sol-gel method. An optical filter 13 is formed such that SiO$_2$ primary particles, secondary and tertiary particles 11 are closely piled on a faceplate 5. Dye 12 is sealed between the particles. The particles are firmly bonded by siloxane bonds. However, since the particles are not subjected to sufficient heat treatment, fine pores 14 exist and infiltration of water, etc. cannot perfectly be prevented.

If such a thin film is wetted with water, e.g. owing to dropwise condensation, repeatedly for a long time, water may infiltrate into the fine pores in the thin film, elute the dye and cause the filter to lose the light selective absorption function.

FIG. 6 shows a structure of the optical filter of the present invention. An optical filter 9 is similar to the optical filter 13 shown in FIG. 5 with respect to its internal structure and structure for sealing the coloring material. The filter 13 differs from the filter 9 in that a Si layer 15 having a fluorine-containing group is formed on the surface of filter 13. By virtue of the fluorine-containing group, the layer 15 has a hydrophobic nature to prevent infiltration of water. Thus, the deterioration or elution of the coloring material resulting from water infiltration can be almost eliminated.

The coloring material used in the present invention is, for example, a dye, an organic pigment, or an inorganic pigment, etc.

The dye is, for example, Kayanalmilling red 6BW (trade name, manufactured by Nihon Kayaku Co.), acid rhodamine B, rhodamine B etc.

The organic pigment is, for example, lake obtained from the above dye, etc.

The inorganic pigment is, for example, a mixture of cobalt aluminate and cadmium red.

The film 9 shown in FIG. 6 is formed, for example, by the following method. The optical filter shown in FIG. 5, which was obtained by a sol-gel method, is immersed in a mixture of a silane compound having a fluorine-containing group and an alkoxy group, water, an acid and alcohol, and is left for a predetermined time period. The resultant optical filter is dried and heated, so that a Si layer 15 having the fluorine-containing group is formed on the surface of the optical filter. The silane compound is, for example, the following:

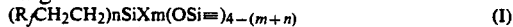
(R$_f$CH$_2$CH$_2$)nSiXm(OSi≡)$_{4-(m+n)}$     (I)

where R$_f$ is a group obtained by substituting fluorine for all hydrogens in an alkyl group (fluoroalkyl group), and X is a desired group such as an alkyl group and a phenyl group.

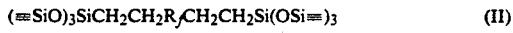
(≡SiO)$_3$SiCH$_2$CH$_2$R$_f$CH$_2$CH$_2$Si(OSi≡)$_3$     (II)

where R$_f$ is represented by

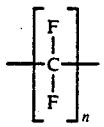

Figure 7:
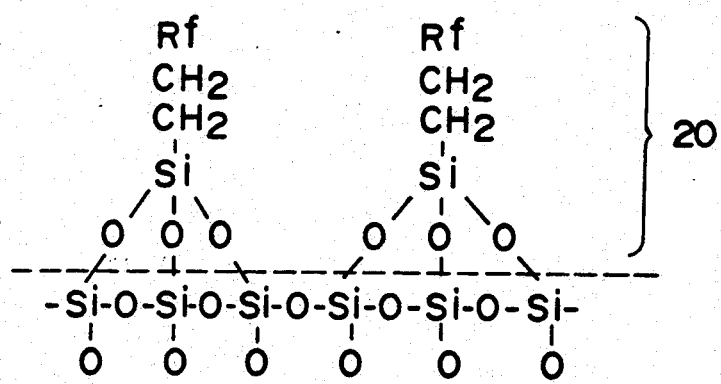
FIGS. 7 and 8 show models of the surface structure of the optical filter used in the cathode ray tube of the invention.

FIG. 7 shows a model of the surface of an optical filter to which the silane compound of type (i) is bonded, with n=1 and m=0.

The alkoxy group in (R$_f$CH$_2$CH$_2$)Si(OR)$_3$ is subjected to hydrolysis to produce a silanol group 20. The silanol group 20 bonds to Si in the filter, and the fluorine-containing group or the hydrophobic group is disposed on the outer side. In this state, the surface energy of the filter is lowered remarkably. Since water is repelled, substantially no water infiltrates the filter.

Figure 8:
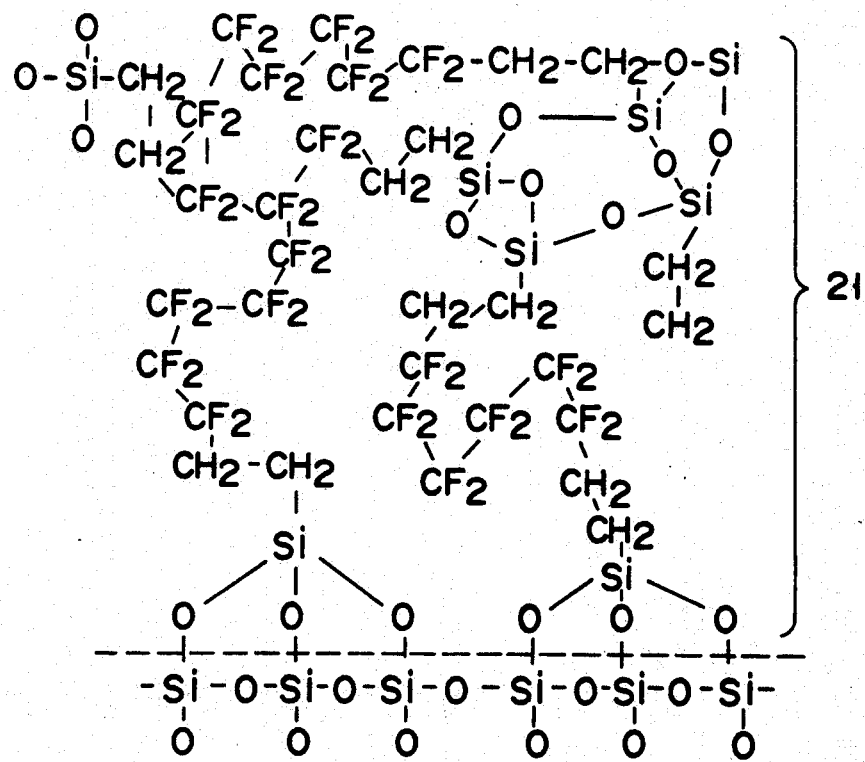

FIG. 8 shows a model of the surface of an optical filter, which was formed by using the silane compound of type (ii).

Like the silane compound of type (i), the alkoxy group in the silane compound is subjected to hydrolysis to produce a silanol group. The silanol group bonds to Si in the filter. Unlike the case with type (i), silane compounds tend to be mutually condensed. Thus, a coating film 21 having a net-like structure as shown in FIG. 8 is likely to be formed. In the case with type (i), the thickness of the layer is no more than that of a monomolecular layer; however, in the case with type (ii), the thickness of the layer is sometimes greater than that of a monomolecular layer. The water-proof property of the cases with type (i) and type ii) are substantially equal.

In general, the outer surface of the faceplate of a cathode ray tube has a high surface resistance. Thus, when the cathode ray tube is operated, static charge is accumulated in the outer surface. The accumulations static charge attracts dust to the outer surface of the faceplate or causes static electric shock to a human body.

To solve these problems, Published Unexamined Japanese Patent Application No. 64-27146 proposes a technique wherein a glass thin film containing a moisture-absorbent metallic salt is formed on the front surface of a faceplate, thereby adding an anti-static function to the cathode ray tube.

According to the cathode ray tube of the present invention, a moisture-absorbent metallic salt is included in an optical filter provided on the faceplate, thereby adding an anti-static function to the optical filter.

The function of the moisture-absorbent salt will now be described.

The moisture-absorbent metallic salt of the present invention is sealed in gaps of a glass skeleton of a glass coating film, which is a main structural constituent of the optical filter, so that moisture in the air is absorbed in a metallic salt. Thus, the low electrical resistance of the glass coating film is achieved.

Any moisture-absorbent metallic salt exhibiting moisture absorptivity can be used. Typically, the moisture-absorbent metallic salt is a salt of an alkali metal or an alkaline-earth metal. Specific examples of the metallic salt are a nitrate, a hydrochloride, a sulfate, a carbonate of Li, K, Na, Ba, Sr and Ca, or a combination thereof.

A thin film containing a moisture-absorbent metallic salt and a coloring material such as a dye can be obtained by mixing a moisture-absorbent salt and a coloring material such as a dye in a mixture solution of a metallic alcoholate. When the mixture solution is matured, the metallic salt is taken in the skeleton structure of Si-O-Si in the first primary particle forming step because the diameter of the metallic salt is small. Most of the metallic salt is sealed in the glass skeleton structure of the primary particles; however, since the dye is a relatively large molecule, the dye is not sealed in the glass skeleton structure in the primary particle forming step. Instead, the dye may be sealed in the primary particles in the secondary particle forming step.

Examples of the optical filter of the present invention will now be described.

EXAMPLE 1

Formation of Glass Thin Film

An alcohol coat solution having the following composition was prepared.

| | |
|---|---|
| tetraethyl silicate (Si(OC$_2$H$_5$)$_4$) | 7 g |
| isopropyl alcohol | 86.3 g |
| hydrochloric acid | 3 g |
| water | 2 g |
| acid rhodamine B | 1.0 g |
| lithium nitrate (LiNo$_3$) | 0.7 g |

The solution was matured for three hours at room temperature (25° C.). Then, the solution was coated on the front surface of the faceplate of a color cathode ray tube of 25 inch size by means of a spin coating process. The coated solution was calcined for 10 minutes at 150° C. Thus, a glass thin film with an average film thickness of 0.1 μm was formed.

Hydrophobic Treatment

The obtained thin film was immersed in a liquid having the following composition and was left for 30 seconds. Then, excess liquid was wiped with dry cloth and the film was dried for two minutes with hot air at 80° C.:

| | |
|---|---|
| CF$_3$(CF$_2$)$_7$CH$_2$CH$_2$Si(OCH$_3$)$_3$ | 2 g |
| water | 0.5 g |
| hydrochloric acid | 0.025 g |
| isopropyl alcohol | 100 g |

Figure 9:
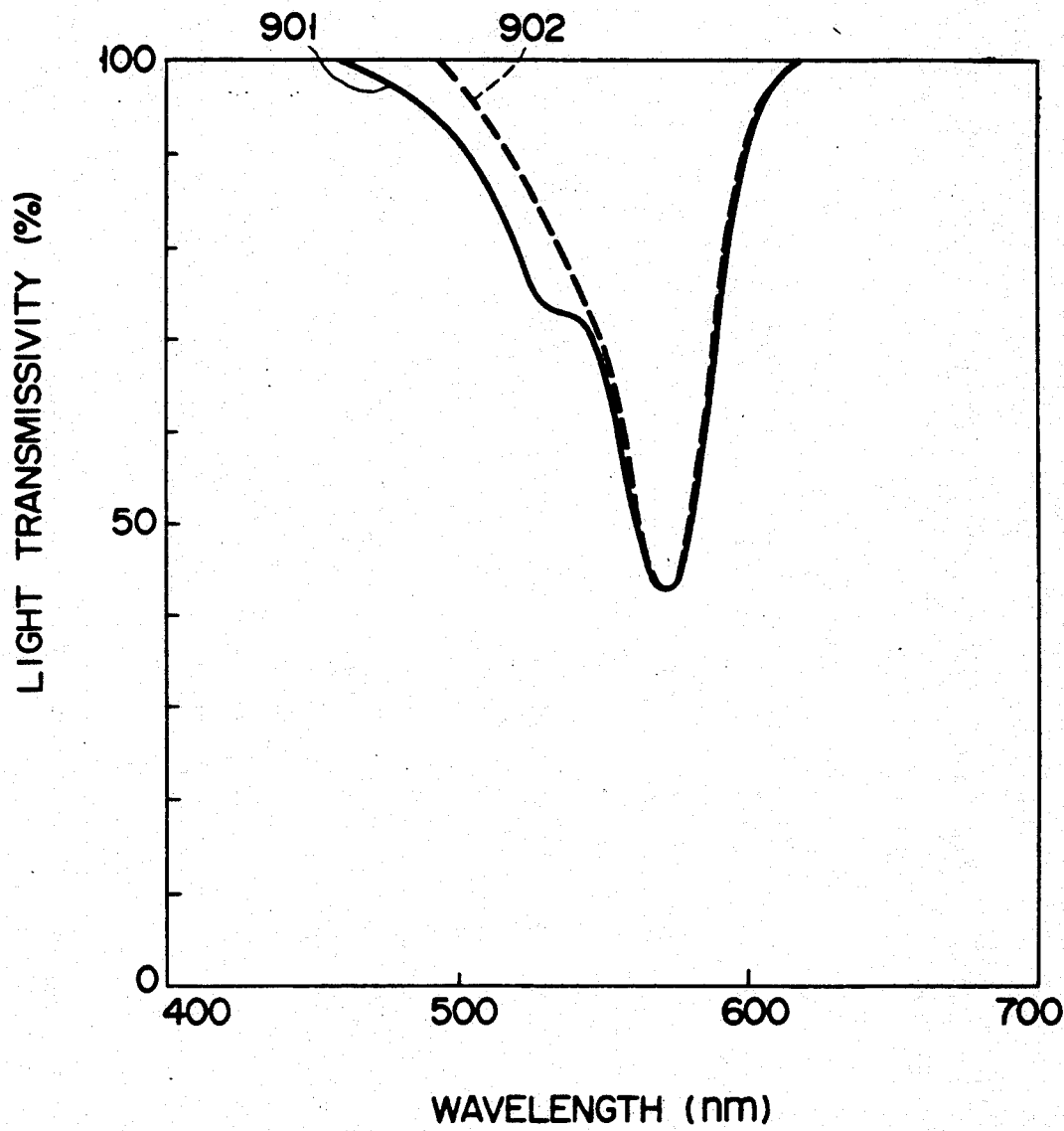
FIG. 9 is a graph showing the light transmissivity of a example of the optical filter used in the cathode ray tube of the invention.

The resistance of the glass thin film was $7 \times 10^8$ Ω/cm$^2$ at a temperature of 80° C. and with a humidity of 40%. FIG. 9 shows the light transmissivities of this glass thin film and a conventional glass thin film.

As is shown in FIG. 9, in the range of wavelength of 550 nm or less, the light transmissivity of the glass thin film of Example 1, denoted by a curve 901, is lower than that of the conventional glass thin film denoted by a curve 902.

A maximum absorption wavelength=575 nm $T_{min} = 51.7\%$ $T_{450} = 100\%$ $T_{530} = 73.3\%$ $T_{550} = 67.1\%$ $T_{630} = 100\%$ Accordingly, the following formulae were satisfied:

$T_{min} \leq T_{550} \leq T_{530}$, $1 \leq T_{450}/T_{530} \leq 2$, $1 \leq T_{630}/T_{530} \leq 2$, $0.7 \leq T_{450}/T_{630} \leq 1.43$.

The BCP of the color cathode ray tube having this glass coating film was 1.25 and had an excellent contrast.

The faceplate with this film was immersed in water for 500 hours at room temperature, and no variation was found in the light transmissivity. The resistance of this glass thin film was $1 \times 10^9$ $\Omega/cm^2$ at a temperature of 20° C. and with a humidity of 40%.

A glass coating film was obtained as Control 1, in the same manner as Example 1, except that the hydrophobic treatment was not performed.

A faceplate with this film was immersed in water for 48 hours at room temperature, and it was found that almost all dye was eluted. The light selective absorption characteristic of the glass thin film was lost completely.

EXAMPLE 2

Using the same method as Example 1, a thin film was formed on a faceplate of a color cathode ray tube, with 2 g of $CF_3(CF_2)_7CH_2CH_2Si(OCH_3)_3$ replaced by 0.5 g of $(H_3CO)_3SiCH_2CH_2(CF_2)_7CH_2CH_2Si(OCH_3)_3$. A thin film having substantially the same resistance and light transmissivity was obtained. This film was immersed in water for 500 hours at room temperature, and it was found that no variation occurred in the light transmissivity.

When the above compound was employed, the same effects were obtained with a smaller amount of addition than in Example 1.

EXAMPLE 3

A coating solution having the following composition was prepared.

| | |
|---|---|
| tetraethyl silicate ($Si(OC_2H_5)_4$) | 7 g |
| isopropyl alcohol | 86.3 g |
| hydrochloric acid | 3 g |
| water | 2 g |
| acid rhodamine B | 1.0 g |
| lithium nitrate ($LiNo_3$) | 0.7 g |

The solution was matured for three hours at room temperature. Then, the solution was coated on the front surface of the faceplate of a color cathode ray tube of 25 inch size by means of a spin coating process. The coated solution was calcined for 10 minutes at 150° C. Thus, a glass thin film with an average film thickness of 0.1 μm was formed.

Subsequently, a liquid having the following composition was prepared:

| | |
|---|---|
| $CF_3(CF_2)_7CH_2CH_2Si(OCH_3)_3$ | 0.5 g |
| water | 0.5 g |
| hydrochloric acid | 0.025 g |
| pentyl alcohol | 100 g |

This liquid was coated on the surface of the thin film with use of cloth or the like, and was left for one minute. In order to prevent the liquid from being dried and solidified, while was left, pentyl alcohol was used as solvent alcohol. Then, excess liquid was wiped with dry cloth and the film was dried for two minutes with hot air at 80° C. The thin film thus obtained had the same resistance and light transmissivity as that of Example 1.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A cathode ray tube vacuum envelope, comprising:
   a faceplate;
   an optical filter formed on an outer surface of said faceplate, said optical filter including mainly $SiO_2$ and containing a coloring material; and pl a phosphor layer formed on an inner surface of the faceplate,
   wherein the optical filter includes silicon compound represented by a formula:

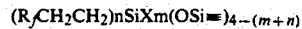

$(R_fCH_2CH_2)nSiXm(OSi\equiv)_{4-(m+n)}$ (n=1 to 3, m=0 to 2, m+n=1 to 3)
   where $R_f$ is a group obtained by substituting fluorine for all hydrogens in an alkyl group, and X is one selected from the group consisting of an alkyl group and a phenyl group, the optical filter having wavelength dependent absorptivity to increase contract performance, a maximum light absorption wavelength in a range of 400 to 650 nm being in a range of 575±20 nm, and wherein the transmissivity for the wavelength of 450 nm is $T_{450}$, that for 530 nm is $T_{530}$, that for 550 nm is $T_{550}$, that for 630 nm is $T_{630}$, and that for the maximum absorption wavelength is Tmin, the various transmissivities satisfying the following relationships:

$T_{min} \leq T_{550} \leq T_{530}$, $1 \leq T_{450}/T_{530} \leq 2$, $1 \leq T_{630}/T_{530} \leq 2$, $0.7 \leq T_{450}/T_{630} \leq 1.43$.

2. A cathode ray tube vacuum envelope, comprising:
   a faceplate,
   an optical filter formed on an outer surface of said faceplate, said optical filter including mainly $SiO_2$ and containing a coloring material; and
   a phosphor layer formed on an inner surface of the faceplate, wherein the optical filter includes silicon compound represented by a formula:

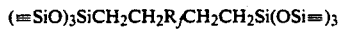

where $R_f$ is represented by

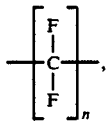

the optical filter having wavelength dependent absorptivity to increase contrast performance, a maximum light absorption wavelength in a range of 400 to 650 nm being in a range of $575\pm20$ nm, and wherein the transmissivity for the wavelength of 450 nm is $T_{450}$, that for 530 nm is $T_{530}$, that for 550 nm is $T_{550}$, that for 630 nm is $T_{630}$, and that for the maximum absorption wavelength is Tmin, the various transmissivities satisfying the following relationships:

$Tmin \leq T_{550} \leq T_{530}$, $1 \leq T_{450}/T_{530} \leq 2$, $1 \leq T_{630}/T_{530} \leq 2$, $0.7 \leq T_{450}/T_{630} \leq 1.43$.

3. A cathode ray tube vacuum envelope, comprising:
a faceplate;
an optical filter formed on an outer surface of said faceplate, said optical filter including mainly $SiO_2$ and containing a moisture-absorbent metallic salt selected from the group consisting of a nitrate, a hydrochloride, a sulfate, and a carbonate of one metal selected from among the group consisting of Li, K, Na, Ba, Sr and Ca embedded in a skeleton structure of the $SiO_2$ and a coloring material selected from the group consisting of a dye, an organic pigment, and an inorganic pigment; and
a phosphor layer formed on an inner surface of the faceplate,
wherein the optical filter includes a silicon compound represented by the formula:

$(R_fCH_2CH_2)nSiXm(OSi\equiv)_{4-(m+n)}$ (n=1 to 3, m=0 to 2, $m+n$=1 to 3)
where $R_f$ is a group obtained by substituting fluorine for all hydrogens in an alkyl group, and X is one selected from the group consisting of an alkyl group and a phenyl group, the optical filter having wavelength dependent absorptivity to increase contrast performance, a maximum light absorption wavelength in a range of 400 to 650 nm being in a range of $575\pm20$ n, and wherein the transmissivity for the wavelength of 450 nm is $T_{450}$, that for 530 nm is $T_{530}$, that for 550 nm is $T_{550}$, that for 630 nm is $T_{630}$, and that for the maximum absorption wavelength is Tmin, the various transmissivities satisfying the following relationships:

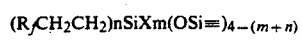

$1 \leq T_{450}/T_{530} \leq 2$, $1 \leq T_{630}/T_{530} \leq 2$, $0.7 \leq T_{450}/T_{630} \leq 1.43$.

4. The cathode ray tube vacuum envelope according to claim 3, wherein said dye is at least one selected from the group consisting of acid rhodamine B and rhodamine B.

5. The cathode ray tube vacuum envelope according to claim 3, wherein said organic pigment is at least one selected from the group consisting of lakes obtained from, acid, rhodamine B and rhodamine B.

6. The cathode ray tube vacuum envelope according to claim 3, wherein said inorganic pigment is a mixture of cobalt aluminate and cadmium red.

7. The cathode ray tube vacuum envelope according to claim 3 wherein said glass layer is formed with use of a metallic alcoholate containing Si.

8. A cathode ray tube vacuum envelope, comprising:
a faceplate;
an optical filter formed on an outer surface of said faceplate, said optical filter including mainly $SiO_2$ and containing a moisture-absorbent metallic salt selected from the group consisting of a nitrate, a hydrochloride, a sulfate, and a carbonate of one metal selected from among the group consisting of Li, K, Na, Ba, Sr and Ca embedded in a skeleton structure of the $SiO_2$ and a coloring material selected from the group consisting of a dye, an organic pigment and an inorganic pigment; and
a phosphor layer formed on an inner surface of the faceplate,
wherien the optical filter includes a silicon compound represented by a formula:

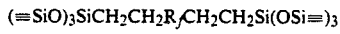

where $R_f$, is represented by

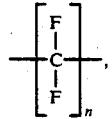

the optical filter having wavelength dependent absorptivity to increase contrast performance, a maximum light absorption wavelength in a range of 400 to 650 nm being in a range of $575\pm20$ nm, and wherein the transmissivity for the wavelength of 450 nm is $T_{450}$, that for 530 nm is $T_{530}$, that for 550 nm is $T_{550}$, that for 630 nm is $T_{630}$, and that for the maximum absorption wavelength is Tmin, the various transmissivities satisfying the following relationships:

$Tmin \leq T_{550} \leq T_{530}$, $1 \leq T_{450}/T_{530} \leq 2$, $1 \leq T_{630}/T_{530} \leq 2$, $0.7 \leq T_{450}/T_{630} \leq 1.54$.

9. The cathode ray tube vacuum envelope according to claim 8, wherein said dye is at least one selected from the group consisting of acid rhodamine B and rhodamine B.

10. The cathode ray tube vacuum envelope according to claim 8, wherein said organic pigment is at least one selected from the group consisting of lakes obtained from, acid rhodamine B and rhodamine B.

11. The cathode ray tube vacuum envelope according to claim 8, wherein said inorganic pigment is a mixture of cobalt aluminate and cadmium red.

12. The cathode ray tube vacuum envelope according to claim 8, wherein said glass layer is formed with a metallic alcoholate containing Si.

* * * * *